Sept. 4, 1962 A. SCHWARZ ET AL 3,052,753
IMAGE PROJECTION APPARATUS
Filed Feb. 16, 1960 4 Sheets-Sheet 3
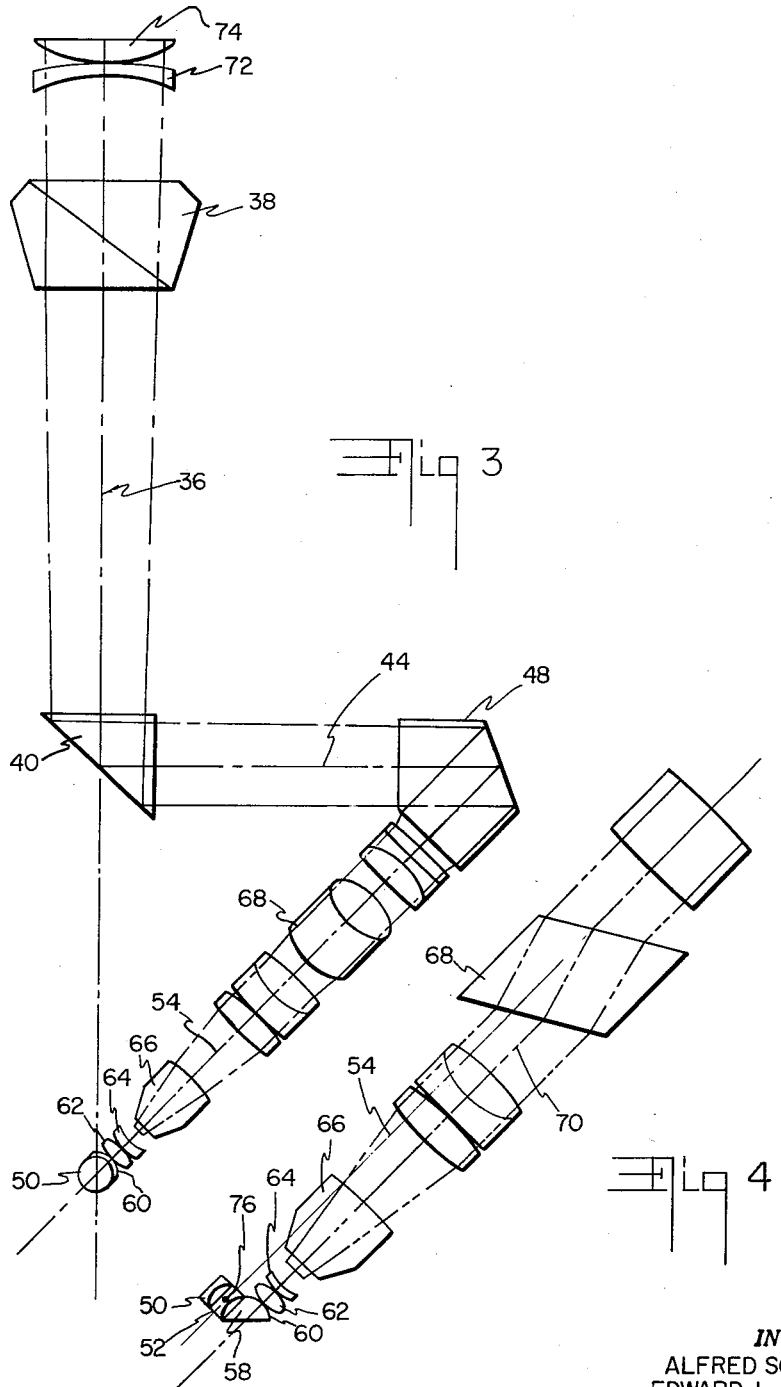
INVENTORS
ALFRED SCHWARZ
EDWARD L. McCARTHY
BY
ATTORNEY

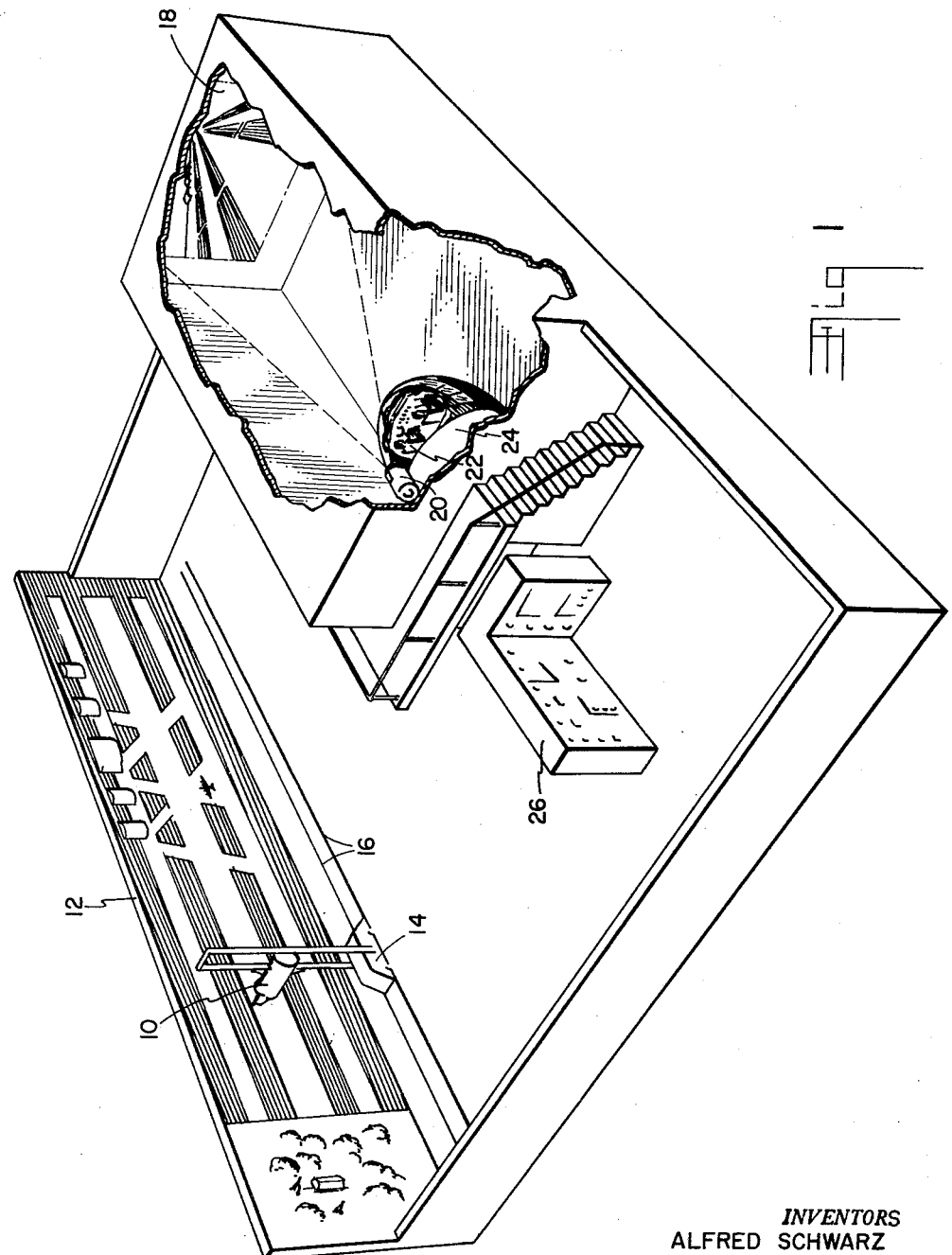

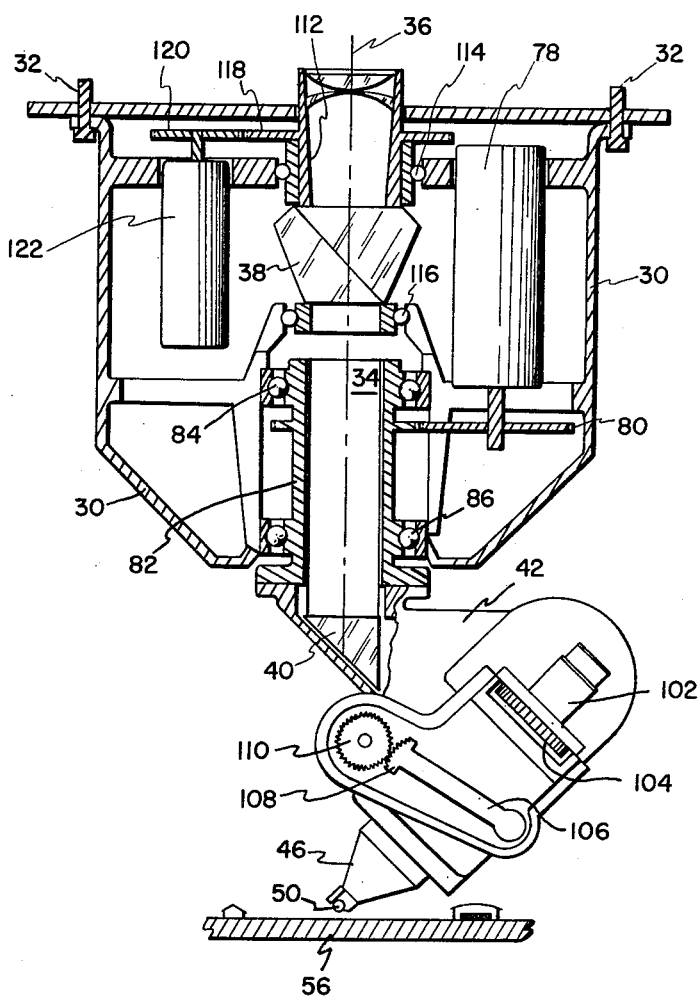

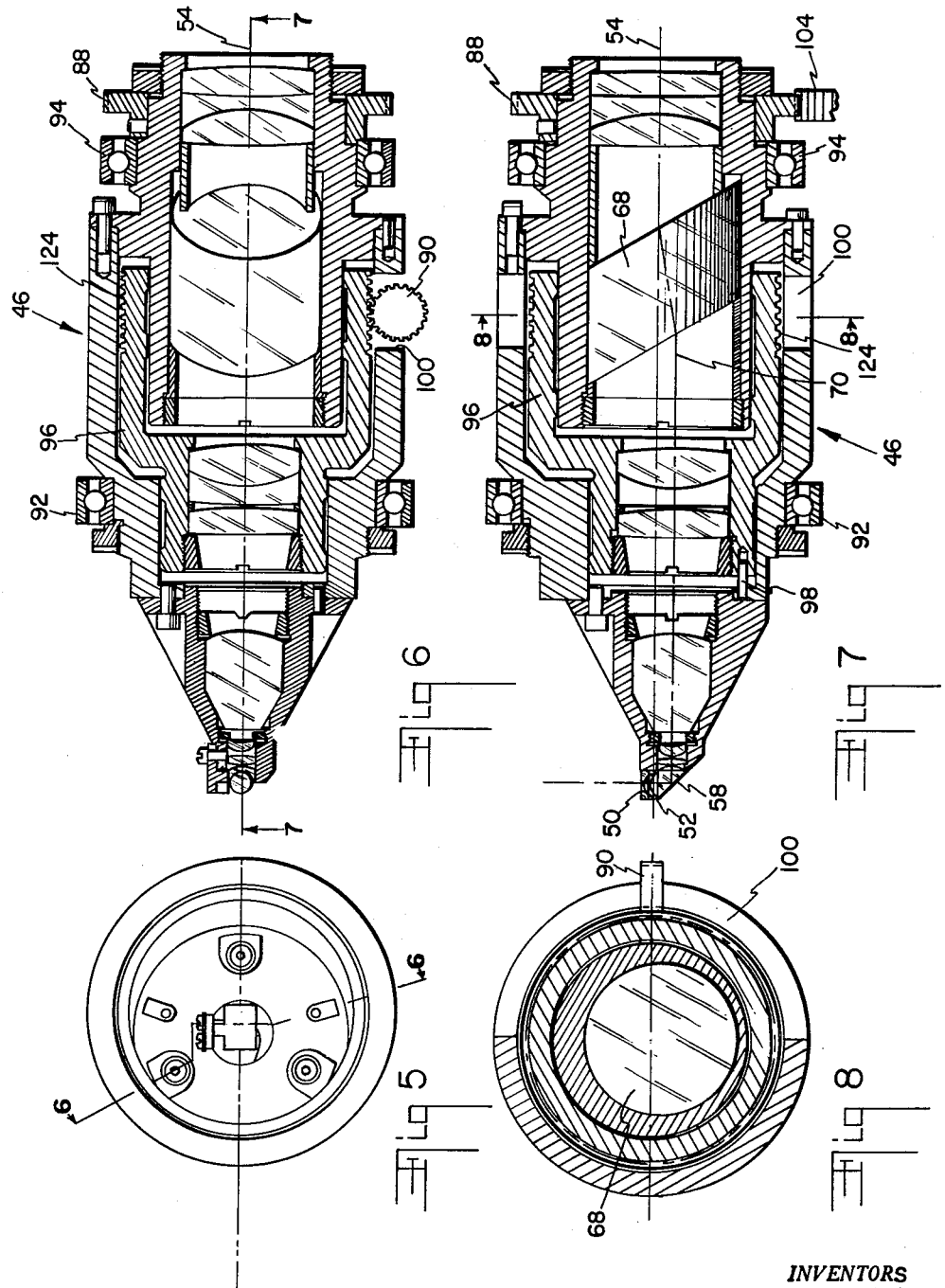

3,052,753
Patented Sept. 4, 1962

3,052,753
IMAGE PROJECTION APPARATUS
Alfred Schwarz, Westport, and Edward L. McCarthy, Darien, Conn., assignors to The Perkin-Elmer Corporation, Norwalk, Conn., a corporation of New York
Filed Feb. 16, 1960, Ser. No. 9,041
20 Claims. (Cl. 178—6)

This invention relates to apparatus for projecting an image to a television camera. More specifically, the apparatus is adapted to closely approach a three dimensional model while retaining the ability to aim toward any position in space.

Simulators for training purposes are becoming more and more common as the instruments of modern technology become more complex and expensive. As an example of such training aids, entire aircraft cockpits, complete with all controls and instrumentation are employed to teach correct flight, approach, and take-off procedures to flight crews.

One such device, specifically constructed for training in approach and landing procedures, utilizes a closed-circuit television system to give pilots a visual runway reference. A scale model airport landscape is projected on a large screen in front of the cockpit. When coupled to simulated operating controls, such a system will reproduce the changes in perspective, attitude, and motion experienced in an actual landing.

The use of models of this type for training purposes is not novel per se. However, such models have, in the past, been so large that specialized housing facilities have been required. A model landing strip, for example, may measure 75 to 80 feet in length and require the construction of a special building. Such large sizes are almost entirely due to the field-of-view and focus limitations imposed by standard television camera lenses.

It will be apparent that a major advance in such training aids would result from a miniaturization of the landing-strip model. However, this has not been achieved in the past because of the unusual problems posed for the television camera optics. The camera lens would have to approach the model to within a few hundredths of an inch in order to utilize a 17 foot model of a 10,000 foot runway. At the same time, the lens would need to be in perfect focus at all times.

Regardless of the small lens size required, no sacrifice in image clarity or system accuracy can be tolerated. Undistorted perspective and uniform brightness must be maintained. Furthermore, these qualities may be required to a full 90°—the normal human span for visual information. It will also be seen that whereas linear aircraft motions, such as altitude, course, and drift may be easily simulated by shifting the entire camera system, it would be desirable to duplicate the rotational movements of roll, pitch, and yaw by the lens system alone. For maximum utility, it is necessary that the pickup lens simulate a 35° angle of elevation and descent from the horizontal with no part of the lens or camera system obstructing the view.

It is, therefore, the primary object of the present invention to provide an image pickup accessory for a television camera. Other objects are to provide such a system capable of close physical approach to the object to be observed; capable of retaining a large field of view; capable of maintaining image clarity, undistorted perspective, and uniform brightness; capable of simulating rotation about any of the three space axes of an aircraft in flight; and capable of such rotation without a blocking of view by system components.

The manner in which the above objects are attained will be apparent from the following description, appended claims, and the eight figures of the attached drawings wherein:

FIG. 1 is an overall view of an aircraft landing simulator embodying the present invention;

FIG. 2 is a partially cut away elevation of the image projector of the invention;

FIG. 3 is an optical schematic of the projector of the invention;

FIG. 4 is another view of a portion of the schematic of FIG. 3;

FIG. 5 is an end view of a portion of the apparatus of FIG. 1;

FIG. 6 is a cross-sectional elevation taken along the line 6—6 of FIG. 5;

FIG. 7 is a cross-sectional elevation taken along the line 7—7 of FIG. 6; and

FIG. 8 is a cross-section taken along line 8—8 of FIG. 7.

In accordance with the present invention, a lens positioning apparatus is provided which comprises lens support means mounted to rotate the lens about two axes of rotation. The first axis of rotation intersects the optical axis of the lens. The second axis of rotation passes through the intersection of the first axis and the optical axis of the lens. Means are provided for rotating the lens about the first axis and for rotating the first axis about the second axis.

The manner in which the present invention is used will be more apparent from FIG. 1 which shows a dolly-mounted television camera 10 movable along a three dimensional model 12 of an airport runway. Forward movement is provided by the travel of dolly 14 along tracks 16. "Altitude" is simulated by movement of camera 10 toward and away from model 12. The simulated "course" is varied by vertical movement of camera 10 up and down the frame of dolly 14. Simulated roll, pitch, and yaw are provided by the apparatus of the invention which is attached to the front of camera 10 and provides a magnified image to the camera objectives. This operation will be more fully explained infra.

The image from camera 10 is projected on a screen 18 by projector 20. The pilot 22 sits in a control cabin mock-up 24 and manipulates the aircraft controls in accordance with his visual observations. The aircraft control outputs are fed to a computer 26 which then controls the various movements of camera 10 and the operation of the image-forming apparatus of the invention.

By reference to FIG. 2, it will be seen that a housing 30 having mounting bolts 32 is provided for attachment to the television camera (not shown). Housing 30 defines a central optical path 34 along combination optical-mechanical axis 36. Path 34 contains a derotation prism 38 and a right angle prism 40 at its lower extremity. A hollow bracket 42 defines a second optical path along an optical axis 44 (FIG. 3) at right angles to axis 36.

Bracket 42 supports a scanning head 46 and its associated driving mechanism as will be more fully explained below. Bracket 42 also supports a prism 48 (FIG. 3) positioned to receive radiation from scanning head 46 and direct it along optical axis 44.

Scanning head 46 includes a pair of plano-concave objective lenses 50, 52 positioned to have a field of view at right angles to major axis 54 of scanning head 46 (FIGS. 3–7). The relationships of scanning head 46 to the three dimensional model will be more apparent from FIG. 2 wherein a model airport 56 is shown in cross-section. Lens 50 is positioned to view along model 56 in a direction out of the surface of the drawing.

Lenses 50 and 52 are cemented to the surface of a right angle prism 58 having a convex lens surface 60 which performs the function of bending the optical axis by 90°. These units, taken in conjunction with lens elements 62 and 64 form a "pick up" lens system. The pick up system is designed to encompass a 90° field of view and form a real image in front of lens 66. The system is further designed telecentric on the image side. Although the size of the image changes as the scanning head approaches or recedes from an object, telecentricity assures that refocusing has no influence on the size. Therefore, correct perspective is maintained even though refocusing may be introduced.

The lens elements shown in detail in FIG. 4 form a conventional magnifying system with the exception of plane parallel plate 68. Plate 68 serves to offset the optical axis from line 70 to mechanical axis 54, which passes through the entrance pupil. The reason for this offset will be explained below. The light is transmitted along optical axes 44 and 36 through lens 72 and lens 74 to the image orthicon camera tube.

The purpose of the camera attachment of this invention is to achieve an image that will duplicate what a pilot would see through the windshield of an aircraft executing a landing at a specific airfield. Insofar as the pilot is concerned, all angular motions of the aircraft appear to take place about axes running through his position in the cockpit. Consequently, it is desirable that the television camera be effectively positioned at the pivot point of the viewing lens. Scanning head 46 and its contained optical system is therefore designed so that the optical conjugate of the camera viewing lens or "pupil" is positioned at point 76 (FIGS. 3 and 4) located at the intersection of mechanical axis 36 and the major axis 54 of scanning head 46. All motion of the pick up lens system is then constrained to rotation about one of these two axes and such rotations do not change the location in space of the entrance pupil. The net result is to offer a pilot the same view he would receive if it were possible for him to actually view the model from point 76.

The purpose of offsetting the optical axis from the mechanical axis within scanning head 46 will be apparent from an examination of FIGS. 4 and 7. The pickup lenses require that the 90° bend in the optical axis produced by prism 58 occur behind the entrance pupil point. At the same time, the pupil of the system must be maintained on mechanical axis 54. By use of plane parallel plate 68, both these objectives are easily and cheaply attained.

The manner in which the apparatus is operated by the pilot to achieve the required view will be apparent from FIG. 2 taken in conjunction with FIGS. 3 and 4. The necessary change in azimuth is accomplished primarily by operation of servo motor 78 and its drive gear 80. Drive gear 80 rotates the hollow shaft 82 and attached prism 40, bracket 42, and scanning head 46 against bearings 84 and 86 about axis 36. This motion alone will be seen to cause the line of sight to "look" in any desired azimuthal direction. Rotation of servo motor 78 is accomplished by actuation of the pilot's controls through the medium of computer 26 which makes any necessary corrections and adjustments of signal.

A second servo motor 102 (FIG. 2) drives gear 104 and gear 88 (FIGS. 6 and 7) which rotates all of scanning head 46 with the exception of focusing pinion 90 about major axis 54. The rotation of head 46 is supported by bearings 92 and 94. Focusing element 96 is constrained by pin 98 to rotate in co-operation with scanning head 46.

Longitudinal motion of focusing element 96 is provided by a focusing pinion 90 mounted on the extension of bracket 42 (FIG. 2) and non-rotatable with respect to scanning head 46. Scanning head 46 is provided with a circumferential slot 100 (FIGS. 6 and 7) which allows approximately 180° rotation of the head without interference from the pinion gear 90. Focusing pinion 90 is driven directly by focusing arm 106 (FIG. 2) which has a sector gear 108 at one end. Sector gear 108 is driven by pinion 110 which is caused to rotate by a focusing servo motor (not shown).

It will be noted that all of scanning head 46 is rotatable including focusing element 96. However, it is important that the longitudinal position of element 96 be maintained in order to keep the televised object in focus. At the same time, it must be possible to change the focus by means of stationary pinion 90 at all possible rotational positions of head 46 and even while head 46 is rotating. This operation is accomplished by replacing the planar rack usually employed for converting rotary motion to linear motion with a cylindrical rack 124. Rack 124 comprises a cylinder having circumferential parallel grooves running along its surface. These grooves mesh with the teeth of pinion 90 in a manner similar to the meshing of an ordinary rack and pinion arrangement.

It will now be apparent that two types of motion are provided by the apparatus of the invention with respect to the viewing lens 50. Rotation about axis 36 provides any desired bearing. Rotation about axis 54 results in a viewing direction that is the resultant of changes in both azimuth and attitude. In effect, the field of view moves along the circumference of a circle inclined to the surface of model 56. By combining these two rotations in the proper amount, it will be seen that a change in attitude alone or any desired combination of attitude and azimuth may be achieved. For example, referring to FIG. 2, if it is desired to effect a change in attitude alone, as in a simulated take-off toward the reader, scanning head 46 may be rotated upwards about its axis and at the same time, the entire assembly may be rotated about axis 36. The computer controlling these movements is programmed in such a way that the various rotations take place at the proper rate. Thus, as the pilot pulls back on the control wheel, head 46 rotates angularly upward and bracket 42 rotates sufficiently to cancel out the horizontal component. As a result, the picture presented to the pilot resembles the view from an airplane climbing off a runway. The image will also roll slightly but this effect may be cancelled by the programmed rotation of derotation prism 38.

The apparatus as so far described will be seen to result in movement of the camera's field of view in any desired direction. However, it will also be apparent that only simulated azimuth and attitude have been affected. In order to provide the required simulation of "roll" or bank about the plane's longitudinal axis, derotation prism 38 (FIGS. 2, 3) is further rotated in optical axis 36. As is well known in the art, when such a prism is rotated, the transmitted image is also rotated at twice the speed of the prism. As illustrated in FIG. 2, prism 38 is affixed to a rotatable tube 112 which is suspended to rotate in bearings 114 and 116. Attached to tube 112 is a driven gear 118. Gear 118 meshes with a driving gear 120 which is controlled by banking servo motor 122. By means of this arrangement, the optical image presented to the television camera is caused to tilt in accordance with the simulated "bank" introduced by the aircraft controls.

It is to be understood that although the invention has been described with particular regard to its utility in an aircraft flight simulator, it is not so limited. The apparatus is also suited for use wherever it is desired to transmit the magnified image of an object to a receiving apparatus. The invention is to be considered as limited only by the scope of the following claims.

We claim:

1. Lens positioning apparatus which comprises lens support means mounted to rotate a lens about two axes of rotation, the first of said axes intersecting the optical axis of the lens, the second of said axes of rotation passing through the intersection of said optical axis and said first axis of rotation; means for rotating said lens about said first axis of rotation; and means for rotating said first axis of rotation about said second axis.

2. The apparatus of claim 1 wherein said first and second axes of rotation intersect at an angle other than a right angle.

3. Lens positioning apparatus which comprises first and second supporting arm means having their ends joined at a fixed acute angle; lens supporting means at the free end of said second arm means; lens rotating means positioned to rotate the optical axis of said lens about said second arm means; means defining a first axis of rotation of said first arm means at the free end thereof, said first axis passing through the intersection of said optical axis and the axis of rotation of said lens about said second arm means; and means for rotating said first and second supporting arm means about said first axis of rotation.

4. Optical imaging apparatus comprising a plurality of optical elements forming an optical path along at least three axes, the first and second of said axes forming an angle with one another, and a third of said axes having one end intersecting said second axis and the other end in substantial alignment with said first axis but removed therefrom; means for rotating all of said first, second, and third axes about said first axis; and means for rotating the optical elements along the third axis about said third axis.

5. Optical imaging apparatus comprising a plurality of optical elements forming a single optical path along at least three axes, the first and second of said axes forming an angle with one another, and a third of said axes lying in the plane formed by said first and second axes and having one end intersecting said second axis and the other end in substantial alignment with said first axis but removed therefrom; means for rotating all of said first, second, and third axes about said first axis; and means for rotating the optical element along the third axis about said third axis.

6. Optical imaging apparatus comprising a plurality of optical elements forming a single optical path along at least four axes, the first and second of said axes forming an angle with one another, a third of said axes having one end intersecting said second axis, and a fourth of said axes having one end intersecting said third axis and the other end in substantial alignment with said first axis but removed therefrom; means for rotating all of said elements about said first axis; and means for rotating the optical elements along the third and fourth axes about said third axis.

7. Optical imaging apparatus which comprises a plurality of optical elements forming a single optical path along at least five successive axes, the first and second of said axes forming an angle with one another, a third of said axes having one end intersecting said second axis, a fourth of said axes parallel to said third axis and displaced therefrom, and a fifth of said axes forming an angle with said fourth axis and passing through a point aligned with both of said first and third axes but removed therefrom; means for rotating all of said elements about said first axis; and means for rotating the optical elements along the third, fourth, and fifth axes about said third axis.

8. The apparatus of claim 7 wherein said first and second axes are substantially perpendicular and said third axis is coplanar with said first and second axes and positioned on that side of said second axis opposite said first axis.

9. Optical imaging apparatus for a television camera which comprises housing means for attachment to said camera, said housing means defining a first optical path aligned with the camera lens; bracket means on said housing means defining a second optical path substantially perpendicular to said first optical path; first reflecting means at the intersection of said first and second optical paths positioned to transfer radiation from one of said paths into the other of said paths; radiation passage defining means defining a third optical path having a fixed end making an acute angle with said second optical path and a dependent end in substantial alignment with the optical axis of said first optical path but displaced therefrom; second reflecting means at the intersection of said second and third optical paths positioned to transfer radiation from one of said paths into the other of said paths; objective lens means at the dependent end of said third optical path, the optical axis of said objective lens means intersecting the optical axis of said third optical path; third reflecting means at the intersection of said optical axes of the objective lens and the third optical path to pass radiation from one axis along the other; a plurality of optical elements along said third optical path for magnifying an image therealong; means for rotating said bracket means and passage defining means about said first optical path; means for rotating said objective lens about said third optical path; and means for focusing the elements along said third optical path.

10. The apparatus of claim 9 wherein said first optical path includes a derotation prism.

11. The apparatus of claim 9 wherein said focusing means comprises a tubular barrel surrounding said third optical path and supporting optical elements therein, said barrel and elements being longitudinally slidable along said path; a plurality of parallel grooves circumferentially surrounding the periphery of said barrel; a pinion gear meshing with said grooves and having its axis of rotation substantially perpendicular to the longitudinal axis of said barrel; and means for driving said pinion gear to longitudinally move said barrel.

12. Radiation focusing apparatus which comprises a first tubular member in longitudinal sliding relationship along a second tubular member; a plurality of tooth means circumferentially encircling substantially the entire periphery of said first member, each of said tooth means lying in a plane perpendicular to the longitudinal axis of said first member; pinion gear means in engaging relationship with said tooth means; and means for driving said pinion gear to longitudinally move said first member with respect to said second member.

13. Radiation focusing apparatus which comprises first tubular means defining a radiant energy path therein; housing means surrounding said first tubular means and spaced therefrom; tubular focusing means positioned between said first tubular means and said housing means and longitudinally slidable therebetween; a plurality of tooth means circumferentially encircling substantially the entire periphery of said tubular focusing means, each of said tooth means lying in a plane perpendicular to the longitudinal axis of said focusing means; pinion gear means in engaging relationship with said tooth means; and means for driving said pinion gear to longitudinally move said focusing means with respect to said housing means.

14. Magnifying apparatus which comprises a first tubular member defining a radiation path and adapted to rotate about a first longitudinal axis contained therein; plane parallel plate means in said first tubular member positioned to transfer the optical axis of said radiation path from the first longitudinal axis to a second longitudinal axis within said tubular member parallel to said first axis but displaced therefrom; circumferential shoulder means on the periphery of said first tubular member and displaced from a first end thereof; a second tubular member having a first end affixed to said shoulder and surrounding said first end of the first tubular member but radially displaced therefrom; optical magnifying means supported by the second end of the second tubular member concentric with said second longitudinal axis and removed from the first end of said first tubular member; reflecting means supported by the second end of the second tubular member on the second longitudinal axis to redirect radiation therealong substantially perpendicular thereto; objective lens means supported by said second end of said second tubular member concentric with the reflected optical axis from said reflecting means; a third tubular member interjacent said first and second tubular members and longitudinally slidable therebetween; optical focusing means supported by said third tubular member and concentric with said second longitudinal axis; and means for sliding said third tubular member to focus said radiation.

15. The apparatus of claim 14 wherein said means for sliding said third tubular member comprises tooth means circumferentially encircling at least a portion of the periphery of said third tubular member, each of said tooth means lying in a plane perpendicular to said longitudinal axes; pinion gear means in engaging relationship with said tooth means; and means for driving said pinion gear to longitudinally move said third tubular member with respect to said first and second tubular members.

16. A motion simulator which comprises three dimensional model means; camera means movable with respect to said model means; supplemental lens means adapted to view said model and project an image thereof to the camera lens; supplemental lens support means mounted on said camera means to rotate said supplemental lens about two axes of rotation, the first of said axes intersecting the optical axis of the supplemental lens and the second of said axes of rotation passing through the intersection of said optical axis and said first axis of rotation; image reproduction means adapted to reproduce the objects perceived by said supplemental lens and said camera means; first control means adapted to control the movements of said camera means; second control means adapted to control the rotaton of said supplemental lens about said first axis of rotation; and third control means adapted to control the rotation of said first axis of rotation about said second axis.

17. The apparatus of claim 16 wherein said first and second axes of rotation intersect at an angle other than a right angle.

18. The apparatus of claim 16 wherein said first and second axes of rotation intersect at an acute angle.

19. A motion simulator which comprises three dimensional model means; camera means movable with respect to said model means; housing means on said camera means defining a first optical path aligned with the camera lens; bracket means on said housing means defining a second optical path substantially perpendicular to said first optical path; first reflecting means at the intersection of said first and second optical paths positioned to transfer radiation from one of said paths into the other of said paths; radiation passage defining means defining a third optical path having a fixed end making an acute angle with said second optical path and a dependent end in substantial alignment with the optical axis of said first optical path but displaced therefrom; second reflecting means at the intersection of said second and third optical paths positioned to transfer radiation from one of said paths into the other of said paths; objective lens means at the dependent end of said third optical path, the optical axis of said objective lens means intersecting the optical axis of said third optical path; third reflecting means at the intersection of said optical axis of the objective lens and the third optical path to pass radiation from one axis along the other; a plurality of optical elements along said third optical path for magnifying an image therealong; image reproduction means adapted to reproduce the objects perceived by said objective leans means and said camera means; first control means adapted to control the movements of said camera means with respect to said model means; second control means adapted to rotate said bracket means and passage defining means about said first optical path; third control means for rotating said objective lens about said third optical path; and means for focusing the elements along said third optical path.

20. The apparatus of claim 19 wherein said first optical path includes a rotatable derotation prism.

References Cited in the file of this patent

UNITED STATES PATENTS

| | | |
|---|---|---|
| 2,413,633 | Jones | Dec. 31, 1946 |
| 2,579,177 | Miles | Dec. 18, 1951 |
| 2,591,752 | Wicklund | Apr. 8, 1952 |
| 2,698,356 | Roos | Dec. 28, 1954 |
| 2,883,763 | Schaper | Apr. 28, 1959 |
| 2,959,779 | Miller | Nov. 8, 1960 |
| 2,979,832 | Klemperer | Apr. 18, 1961 |